L. PRAHAR.
POCKET-BOOK FASTENER.

No. 177,747.   Patented May 23, 1876.

WITNESSES:
A. W. Almqvist
John Goethals

INVENTOR:
L. Prahar
BY
ATTORNEYS.

N. PETERS, PHOTO-LITHOGRAPHER, WASHINGTON, D. C.

UNITED STATES PATENT OFFICE.

LOUIS PRAHAR, OF NEW YORK, N. Y.

IMPROVEMENT IN POCKET-BOOK FASTENERS.

Specification forming part of Letters Patent No. 177,747, dated May 23, 1876; application filed March 25, 1876.

*To all whom it may concern:*

Figure 1:
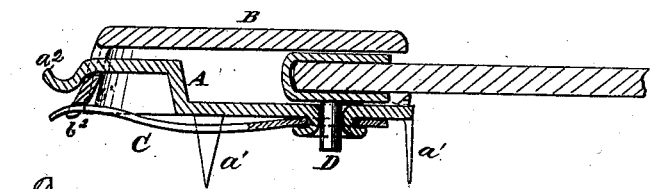
Figure 2:
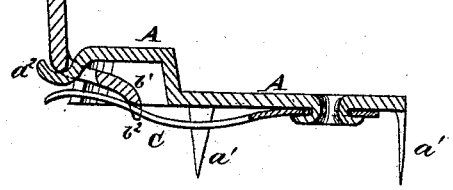
Figure 3:
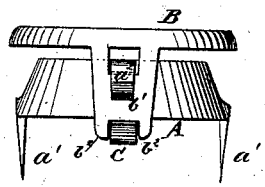

Be it known that I, LOUIS PRAHAR, of New York, and county and State of New York, have invented a new Improvement in Pocket-Book Fasteners, of which the following is a specification:

Figure 1 is a longitudinal section of my improved fastener, shown as fastened. Fig. 2 is the same section as Fig. 1, but shown as unfastened. Fig. 3 is a rear-end view of the same.

The object of this invention is to simplify the construction and lessen the cost of manufacture of pocket-book fasteners, and at the same time furnish a fastener not liable to get out of order.

The invention will first be described in connection with drawing, and then pointed out in claim.

A represents the base or inner plate of the fastener, which is made with points or claws $a^1$ upon its edges, to be passed through and turned down upon the under side of the article to which it is to be attached. The rear part of the plate A is struck up or made with an offset, to form a recess to receive the arm $b^1$ of the upper or face plate B. The flange of the plate A, at its rear end, has two slits made in it, to form an arm, $a^2$, which passes through a short slot formed in the arm $b^1$ of the plate B, and thus hinge the two plates B A together. The end of the arm $a^2$, after being passed through the arm $b^1$, is bent up to prevent the arm $b^1$ from slipping out of place or off. The end of the arm $b^1$ is bent outward to rest upon the spring C and hold the plate B in place, both when fastened and when unfastened, and has a notch, $b^2$, formed in it, to receive the spring C and prevent the said spring from turning out of place sidewise.

The inner end of the spring C is secured to the under side of the plate A by having a hole formed through it, and punching a hole through the said plate A, through the hole in the said spring C, and turning the burr down upon the said spring, securing the spring, and at the same time forming an eyelet to receive the pin D, attached to the flap of the pocket-book.

Having thus described my invention, what I claim, and desire to secure by Letters Patent, is—

The combination of base-plate A, having arm $a^2$ on its rear end, with the face-plate B, having a slotted arm, $b^1$, substantially as and for the purpose specified.

LOUIS PRAHAR.

Witnesses:
JAMES T. GRAHAM,
T. B. MOSHER.